US012497185B2

(12) United States Patent
Mikic et al.

(10) Patent No.: US 12,497,185 B2
(45) Date of Patent: Dec. 16, 2025

(54) MANAGING COOLING AIRFLOW USING VARIABLE-GEOMETRY OPENINGS

(71) Applicant: Joby Aero, Inc., Santa Cruz, CA (US)

(72) Inventors: Gregor Veble Mikic, Santa Cruz, CA (US); Benjamin Brelje, Ann Arbor, MI (US); Jeffrey Allen Lotterman, Los Angeles, CA (US); Robert Gulliver Lynn, Auckland (NZ)

(73) Assignee: Joby Aero, Inc., Santa Cruz, CA (US)

( * ) Notice: Subject to any disclaimer, the term of this patent is extended or adjusted under 35 U.S.C. 154(b) by 63 days.

(21) Appl. No.: 18/398,841

(22) Filed: Dec. 28, 2023

(65) Prior Publication Data

US 2024/0217669 A1 Jul. 4, 2024

Related U.S. Application Data

(60) Provisional application No. 63/477,497, filed on Dec. 28, 2022.

(51) Int. Cl.
*B64D 33/08* (2006.01)
*B60L 58/33* (2019.01)
(Continued)

(52) U.S. Cl.
CPC .............. *B64D 33/08* (2013.01); *B60L 58/33* (2019.02); *B64C 3/38* (2013.01); *B64D 27/31* (2024.01);
(Continued)

(58) Field of Classification Search
CPC ...... B64D 27/31; B64D 27/355; B64D 33/08; B64C 3/38; B60L 58/33
(Continued)

(56) References Cited

U.S. PATENT DOCUMENTS 10,662,859 B1 * 5/2020 Harris ...................... F01P 7/16
11,565,607 B2 1/2023 Mikic et al.
(Continued)

OTHER PUBLICATIONS

Feng, Jianmei, "Designing Hydrogen Recirculation Ejectors for Proton Exchange Membrane Fuel Cell Systems", Energies Journal, (Jan. 21, 2023), 11 pgs.
(Continued)

*Primary Examiner* — Brady W Frazier
(74) *Attorney, Agent, or Firm* — SCHWEGMAN LUNDBERG & WOESSNER, P.A.

(57) ABSTRACT

A variable-geometry cooling airflow management system and method for managing the cooling of a fuel cell on an aerodynamic vehicle (such as an aircraft). The cooling management is achieved by providing a conduit having a fan, radiator, and variable-geometry openings (such as variable-geometry inlet and variable-geometry outlet) at the conduit ends. Heat from the fuel cell is transferred to a coolant, which then flows through the radiator in the conduit. Cooling airflow passes over the radiator to provide fuel cell cooling. The amount of cooling airflow over the radiator is adjusted by varying the size of the variable-geometry inlet, the variable-geometry outlet, or both. Adjustments are made based on the operational parameters of the aircraft such as airspeed and flight configuration. A fan also may be located in the conduit, a speed of which is varied by the control system based on the operational parameters of the aircraft.

16 Claims, 9 Drawing Sheets

(51) Int. Cl.
*B64C 3/38* (2006.01)
*B64D 27/31* (2024.01)
*B64D 27/355* (2024.01)
*H01M 8/04007* (2016.01)
*H01M 8/04029* (2016.01)
*H01M 8/04746* (2016.01)

(52) U.S. Cl.
CPC ...... *B64D 27/355* (2024.01); *H01M 8/04029* (2013.01); *H01M 8/04067* (2013.01); *H01M 8/04768* (2013.01); *B60L 2200/10* (2013.01); *H01M 2250/20* (2013.01)

(58) Field of Classification Search
USPC .......................................................... 244/57
See application file for complete search history.

(56) References Cited

U.S. PATENT DOCUMENTS

| | | |
|---|---|---|
| 11,752,899 B2 | 9/2023 | Mikic et al. |
| 2003/0230671 A1 | 12/2003 | Dunn |
| 2017/0036775 A1* | 2/2017 | Jones .................. F01P 3/20 |
| 2018/0066584 A1* | 3/2018 | Twelves ............. F01D 25/12 |
| 2022/0009379 A1 | 1/2022 | Mikic et al. |
| 2023/0014276 A1* | 1/2023 | Bueno Vazquez ...... B60L 58/33 |
| 2023/0335763 A1* | 10/2023 | Earl .................. H01M 8/04067 |

OTHER PUBLICATIONS

Han, Jiquan, "A review of key components of hydrogen recirculation subsystem for fuel cell vehicles", Energy Conversion and Management: X 15, (2022), 16 pgs.

\* cited by examiner

MANAGING COOLING AIRFLOW USING VARIABLE-GEOMETRY OPENINGS

RELATED APPLICATION DATA

This application claims the benefit of U.S. Provisional Patent Application No. 63/477,497 filed on Dec. 28, 2022, the contents of which are incorporated herein by reference as if explicitly set forth.

TECHNICAL FIELD

This invention relates generally to the field of fuel cell cooling, and, more particularly, to managing the cooling airflow of hydrogen fuel cells on aerodynamic vehicles (such as electrically-powered or hybrid-powered aircraft) using variable-geometry openings.

BACKGROUND

A fuel cell is an electrochemical cell that converts the chemical energy of a fuel (often hydrogen) and an oxidizing agent (often oxygen) into electricity through a pair of redox reactions. Fuel cells have been used to generate electrical power in many applications. Fuel cells are used for primary and backup power for commercial, industrial, and residential buildings and in remote or inaccessible areas. They are also used to power fuel cell vehicles, including forklifts, automobiles, buses, trains, boats, motorcycles, and submarines.

Fuel cell vehicles are powered by hydrogen that is fed into an onboard fuel cell "stack," which transforms the hydrogen's chemical energy into electrical energy. This electricity is then available to power the vehicle and its onboard systems. Hydrogen supplied to a fuel cell enters the anode, where it comes in contact with a catalyst that promotes the separation of hydrogen atoms into an electron and proton. The electrons are gathered by the conductive current collector, which is connected to the vehicle's high-voltage circuitry, feeding an onboard battery and/or electric motors that propel the vehicle. The byproduct of the reaction occurring in the fuel cell stack is water vapor, which is emitted through an exhaust.

Also included in fuel cell powered vehicles is a "balance-of-plant," which contains all of the other components of a fuel cell system except the stack itself. This includes pumps, sensors, heat exchanger, gaskets, compressors, recirculation blowers or humidifiers, and so forth.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
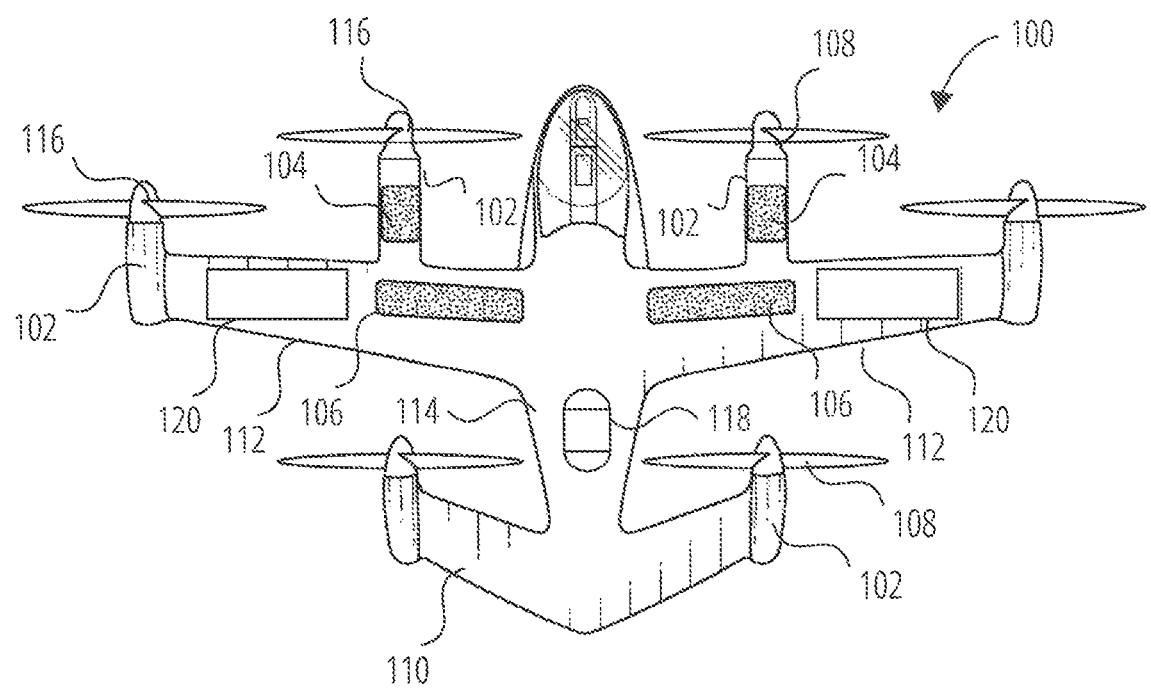
FIG. 1 is a plan view of an aerodynamic vehicle in the form of an aircraft according to some examples.

The following description of examples of the invention is not intended to limit the invention to these examples, but rather to enable any person skilled in the art to make and use this invention.

General Overview

Hydrogen fuel cells, as well as other types of non-combustion turbine propulsion power systems, have large cooling requirements. This can make designing a cooling system for fuel cells on aerodynamic vehicles quite challenging. As used herein, the phrase "aerodynamic vehicle" includes vehicles moving through air that are affected by aerodynamics forces. This includes aircraft and automobiles. In examples where the aerodynamic vehicle is an aircraft, cooling the one or more fuel cells powering an electric or hybrid aircraft may be done with air.

Air cooling of a fuel cell on an aircraft, however, typically incurs a large aircraft drag price in the form of pressure losses in the airflow as it passes through the aircraft. To avoid this large drag penalty, the speed of the cooling airflow should be significantly less than the freestream air. Commercial aircraft fly routinely fly at altitudes over 10 kilometers and at speeds around 200 to 250 meters per second. For a fuel cell cooling system to work efficiently, the freestream air should be slowed down to a low enough speed (typically a few meters to tens of meters per second) so that the cooling airflow can pass through compact and lightweight internal heat exchangers (similar to car radiators).

Air ducts commonly used on aircraft are usually not enough to efficiently slow the freestream air to the cooling airflow speed. Some examples of the variable-geometry cooling airflow management system and method discussed herein efficiently slow down the freestream using the operation and location of variable-geometry openings. These variable-geometry openings are in the form of a variable-geometry inlet and a variable-geometry outlet, either alone or in combination. The geometry of the openings is varied such that the size and, in some examples, the shape of the openings is adjusted. These adjustments are made in response to operational parameters, such as aircraft speed and operating configuration. Moreover, in some examples, adjustments to other cooling devices are made based on the operational parameters. For example, the speed of a cooling fan may be adjusted based on whether the aircraft is in vertical flight or in cruise flight.

The variable-geometry inlets are located at or near forward-facing surfaces on the aircraft. These forward-facing surfaces often include stagnation points (or stagnation zones), where air flowing around the aircraft slows efficiently to very low speeds relative to the freestream air and the air pressure and temperature are higher. Air at or near stagnation points can be bought into the aircraft through openings at low speeds with very low energy losses and minimal drag penalty. In some examples, the variable-geometry cooling airflow management system and method includes a variable-geometry inlet located on an aircraft at stagnation points on the leading edges of wings or other aerosurfaces, wing nacelles, or fuselage noses. In other examples, these variable-geometry inlets are in scoops sticking out from the sides of aircraft fuselages, wings, or nacelles.

The variable-geometry cooling airflow management system and method operates as follows. Heat generated by fuel cells is transferred to a coolant through a heat exchanger. The coolant is transported to an integrated air-cooling system having a variable-geometry inlet and a variable-geometry outlet. Freestream air is first slowed down via the variable-geometry inlets and the cooling airflow enters the aircraft. This cooling airflow flows through a fan in some examples. Then the cooling airflow travels through a radiator where heat is transferred from the coolant to the cooling airflow.

The cooling airflow then exits through a variable-geometry outlet at an elevated pressure and temperature. In some examples, this exhausted air is ejected at a speed even greater than the velocity of the freestream air (or aircraft speed), providing a net useful thrust as a low-temperature ramjet.

Examples of the variable-geometry cooling airflow management system and method manage cooling airflow using a variable-geometry outlet, a variable-geometry inlet, or both. In some examples, the variable-geometry outlet feature maximizes the exhaust velocity of the cooling airflow through the outlet. The general idea is to set the geometry of the outlet to provide just enough cooling to prevent overheating. This configuration of the outlet, which varies based on a number of factors, maximizes the temperature of the exhaust air and thereby maximizes the thrust at the outlet. In some examples, the variable-geometry cooling airflow management system and method includes a powered fan. At low speeds, as taxiing or during vertical takeoff and landing (VTOL) for VTOL aircraft, forward flight may not provide adequate cooling, so a powered fan is included to provide additional cooling during these operational phases.

DESCRIPTION

FIG. 1 is a plan view of an aerodynamic vehicle in the form of an aircraft 100 according to some examples. The aircraft 100 includes a fuselage 114, two wings 112, an empennage 110, and propulsion systems 108 embodied as ducted fans or rotor assemblies 116 located in nacelles 102. The aircraft 100 includes one or more fuel cell stacks embodied in FIG. 1 as nacelle fuel cell stacks 104 and wing fuel cell stacks 106. One or more heat exchangers 120 are located in the wings 112, the fuselage 114, or other locations. It should be noted that the fuel cell stacks 104, 106 and heat exchangers 120 in some examples are positioned in locations other than those shown in FIG. 1. For instance, in some examples the fuel cell stacks and heat exchangers are located in one or more of the leading edges of wings or other aerosurfaces, wing nacelles, fuselage noses or in scoops sticking out from the sides of aircraft fuselages, wings, or nacelles.

The aircraft 100 will also typically include associated equipment such as an electronic infrastructure, control surfaces, a cooling system, landing gear and so forth. The wings 112 function to generate lift to support the aircraft 100 during forward flight. In some examples the wings 112 can additionally or alternately function to structurally support the fuel cell stacks 104, 106 and/or propulsion systems 108 under the influence of various structural stresses (e.g., aerodynamic forces, gravitational forces, propulsive forces, external point loads, distributed loads, and/or body forces, and so forth).

Figure 2:
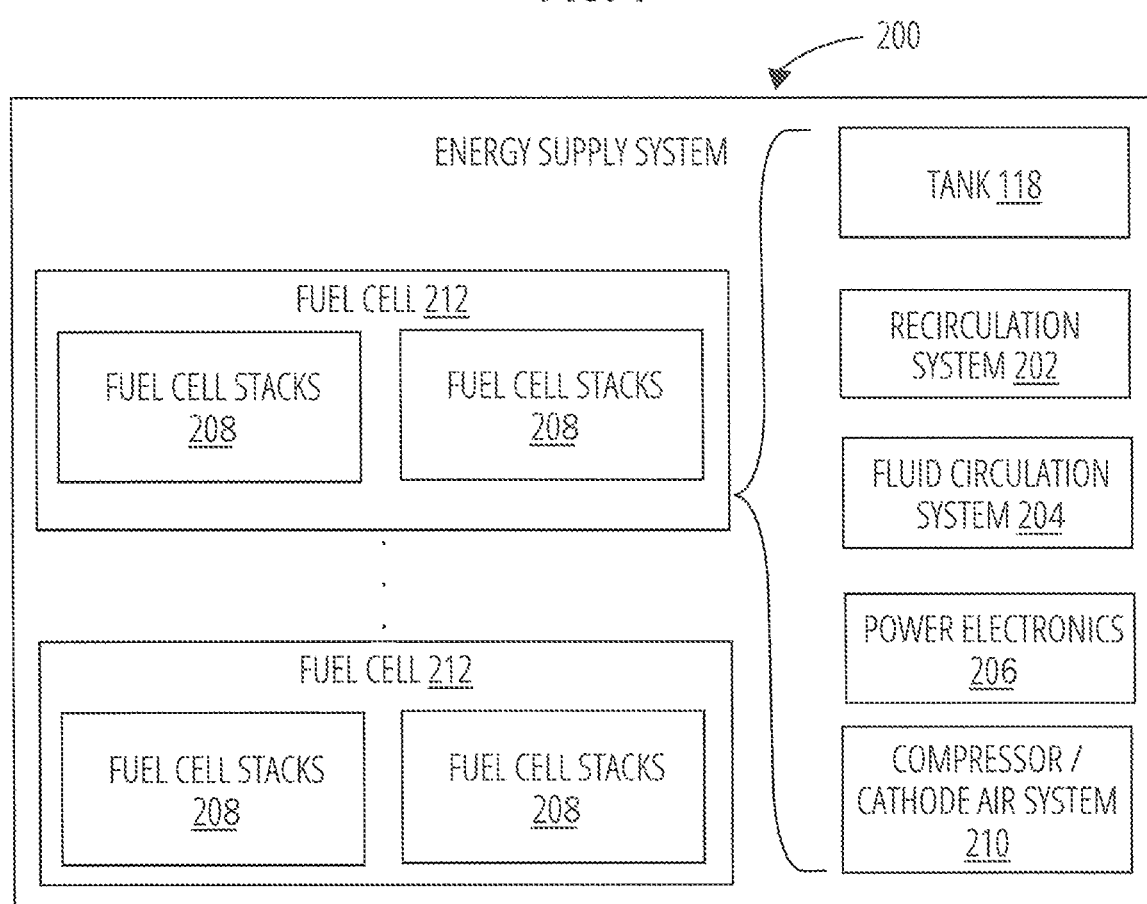
FIG. 2 is a schematic view of an energy supply system for an aerodynamic vehicle (such as an aircraft) according to some examples.

FIG. 2 is a schematic view of an energy supply system 200 for an aerodynamic vehicle (such as an aircraft 100)) according to some examples. As shown, the energy supply system 200 includes one or more fuel cells 212. Each fuel cell 212 may include one or more fuel cell stacks 208. Typically associated with a fuel cell 212 are a source of hydrogen such as a liquid or compressed gaseous hydrogen tank 118, a recirculation system 202 for supplying and returning hydrogen to the fuel cell 212, a coolant fluid circulation system 204 for transferring heat, power electronics 206 for regulating delivery of electrical power from the fuel cells 212 during operation and to provide integration of the fuel cells 212 with the electronic infrastructure of the aircraft 100, and a compressor/cathode air system 210 for providing compressed air to the fuel cells 212. The electronic infrastructure can include an energy supply management system, for monitoring and controlling operation of the fuel cells 212.

The fuel cells 212 function to convert chemical energy into electrical energy for supply to the propulsion systems 108. Fuel cells 212 can be arranged and/or distributed about the aircraft 100 in any suitable manner. Fuel cell stacks can be arranged within wings (e.g., inside of an airfoil cavity), inside nacelles, and/or, as discussed below, in any other suitable location on the aircraft.

Also provided may be one or more battery packs for energy storage for start-up, for peak power loads, load following, and also for control and avionics safety in case of a failure in the fuel cell system. In some examples this provides a hybrid fuel cell and battery pack system, in which the propulsion systems 108 are powered jointly or alternately by the fuel cells 212 and battery packs, and in which the fuel cells recharge the battery packs as needed.

The energy supply system 200 can optionally include a heat transfer system (e.g., fluid circulation system 204) and/or that functions to transfer heat from or to various components of the aircraft 100, for example by circulating a working fluid within a fuel cell 212 to remove heat generated during operation, to provide heat for evaporation of liquid hydrogen from the hydrogen tank 118, or to remove heat from other heat-generating components within the aircraft 100.

Figure 3:
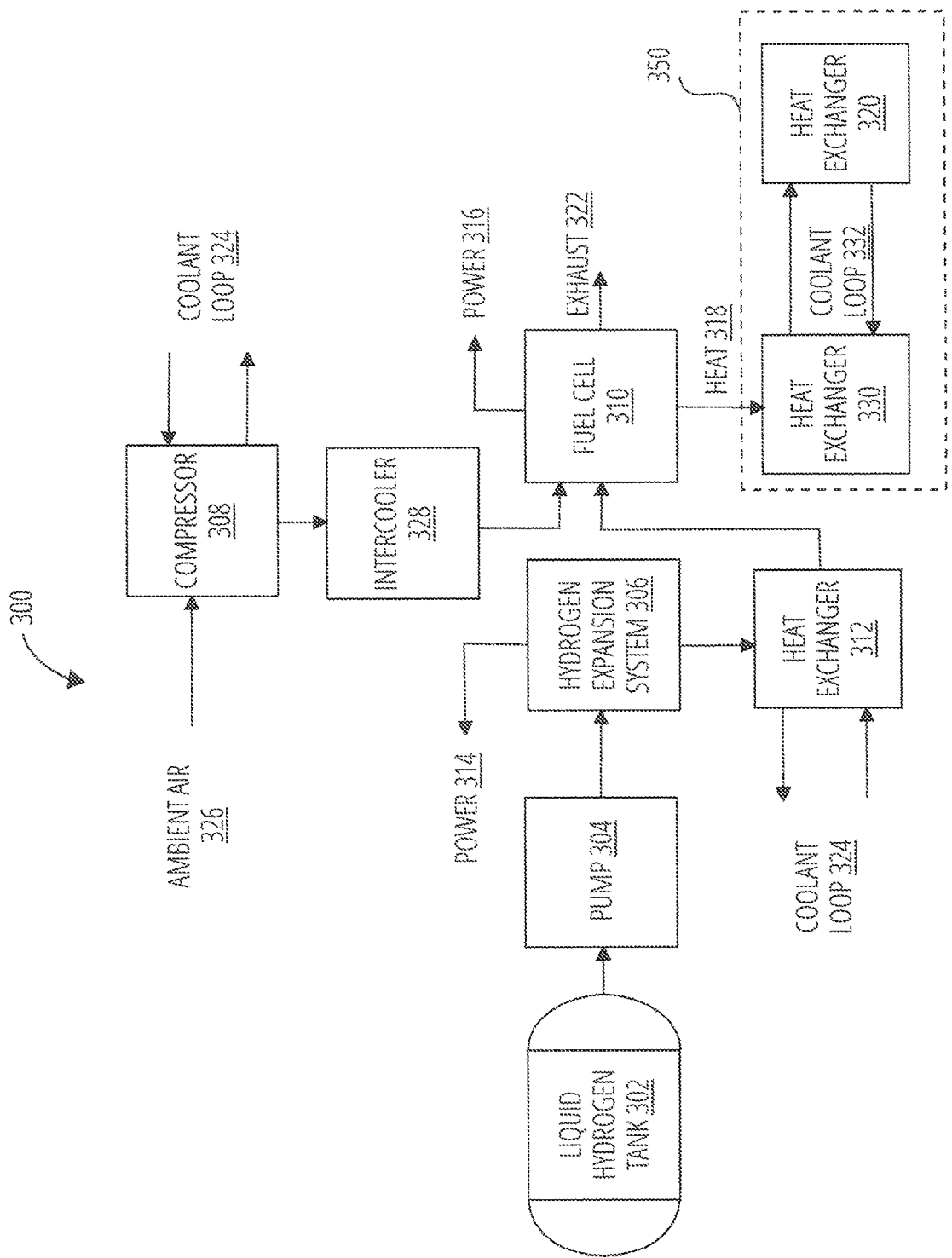
FIG. 3 is a schematic diagram illustrating a hydrogen fuel cell system, according to some examples.

FIG. 3 is a schematic diagram illustrating a hydrogen fuel cell system 300, according to some examples. The hydrogen fuel cell system 300 comprises a liquid hydrogen tank 302, a pump 304, a hydrogen expansion system 306, a heat exchanger 312, a compressor 308 and a fuel cell 310.

The liquid hydrogen tank 302 stores liquid hydrogen for use in the fuel cell 310. The liquid hydrogen tank 302 is connected to and supplies liquid hydrogen to the pump 304. The pump 304 pressurizes the liquid hydrogen and supplies it to the hydrogen expansion system 306.

The hydrogen expansion system 306 vaporizes and expands the liquid hydrogen from the pump 304 closer to, or to, the pressure and temperature required by the fuel cell 310. Since the evaporation and expansion of the liquid hydrogen requires heat, the hydrogen expansion system 306 can also provide cooling, via a coolant loop 324, to other heat-generating systems, such as the fuel cell 310 or to the compressor 308, which is used to compress the air containing the oxygen used by the fuel cell 310.

Warmer, but still cold, hydrogen gas leaving the hydrogen expansion system 306 passes through a heat exchanger 312, which is thermally coupled to a coolant loop 324. The coolant loop 324 includes a coolant liquid that can be circulated to and from a heat source (not shown) to cool the heat source. In some examples, the cold hydrogen gas leaving the hydrogen expansion system 306 may cool a heat source more directly, for example by having the heat exchanger 312 located at or near the heat source, such as compressor 308. In some examples, expansion of the hydrogen in the hydrogen expansion system 306 may be used to perform work, resulting in the generation of supplemental power 314.

The compressor 308 compresses ambient air 326 for supply to the fuel cell at the pressure required by the fuel cell 310. Compressing the ambient air 326 increases its temperature. The coolant from the coolant loop 324 may thus be used to precool the ambient air 326 at the inlet of the compressor 308, or to cool the compressor 308 itself. Supplying cooler air to the compressor 308 increases its efficiency. If needed, compressed air leaving the compressor 308 is cooled by an intercooler 328 before being passed to the fuel cell 310. In some examples the coolant loop 324 is also used to cool the fuel cell 310 in addition to or instead of cooling the ambient air 326 or the compressor 308.

Warmer hydrogen gas leaving the heat exchanger 312 is received by the fuel cell, which together with the compressed air received from the compressor 308, generates electrical power 316, heat 318 and a water vapor exhaust 322 as is known in the art. The heat 318 that is generated by the operation of the fuel cell 310 is removed by coolant flowing in a heat exchanger 330, as part of a coolant loop 332. The coolant loop 332 circulates the coolant to the heat exchangers 320 located in various locations of the aerodynamic vehicle (such as in the wings 112 when the aerodynamic vehicle is an aircraft 100), where the coolant in the coolant loop 332 is cooled by ambient air. Details of examples of the heat exchangers 320 as well as the heat exchangers 330 and the coolant loop 332 (all shown by dashed line 350) are described below and shown in FIGS. 4-9.

Integrated Cooling System

In some examples of the variable-geometry cooling airflow management system and method, the heat exchangers 320, shown in FIG. 3, are an integrated cooling system. The integrated cooling system includes one or more of the following: a variable-geometry inlet, a variable-geometry outlet, a radiator, and a fan.

The integrated cooling system may be positioned in virtually any location on the aerodynamic vehicle. Practically, however, the integrated cooling system is positioned in one or more various locations on the aerodynamic vehicle depending on several factors including the operating environment, vehicle design, and how the vehicle will be used. Some of the possible locations where the integrated cooling system may be placed on the aerodynamic vehicle are shown in FIGS. 4-9 and discussed below.

Operating environment factors include whether the vehicle will be used in a high-temperature environment, at high altitudes, and at high or low speeds. At low speeds it become less critical to slow down the freestream air a great deal. But if the operating environment is a high-speed, high-altitude situation, the placement near a stagnation point becomes more important. Vehicle design factors include whether the vehicle is designed to carry persons or is remote controlled. Vehicle use factors include the configuration the vehicle will be in including, for the case when the aerodynamic vehicle is an aircraft, whether the aircraft is a Vertical Take-Off and Landing (VTOL) aircraft.

In some examples the integrated cooling system is positioned in locations where the air is slower than the freestream air, such as forward-facing surface of the vehicle. At these locations there are usually stagnation points (or stagnation zones), where air flowing around the aircraft slows efficiently to very low speeds relative to the freestream air and the air pressure and temperature are higher. In examples where the aerodynamic vehicle is an aircraft, the locations of the integrated cooling system are typically at the leading edges of wings or other aerosurfaces, wing nacelles, or fuselage noses. In other examples, these inlets are in scoops sticking out from the nose of the aircraft, the aircraft fuselage sides, top or bottom, the wings, or nacelles.

If the aircraft is unpiloted then the nose is a useful area to locate the integrated cooling system. This is because there is no need to keep equipment out of the way of a pilot and there is a large amount of cooling space in a small volume. Also, there is usually no need for long runs of cooling lines as the fuel cells are commonly located near to the nose.

Figure 4:
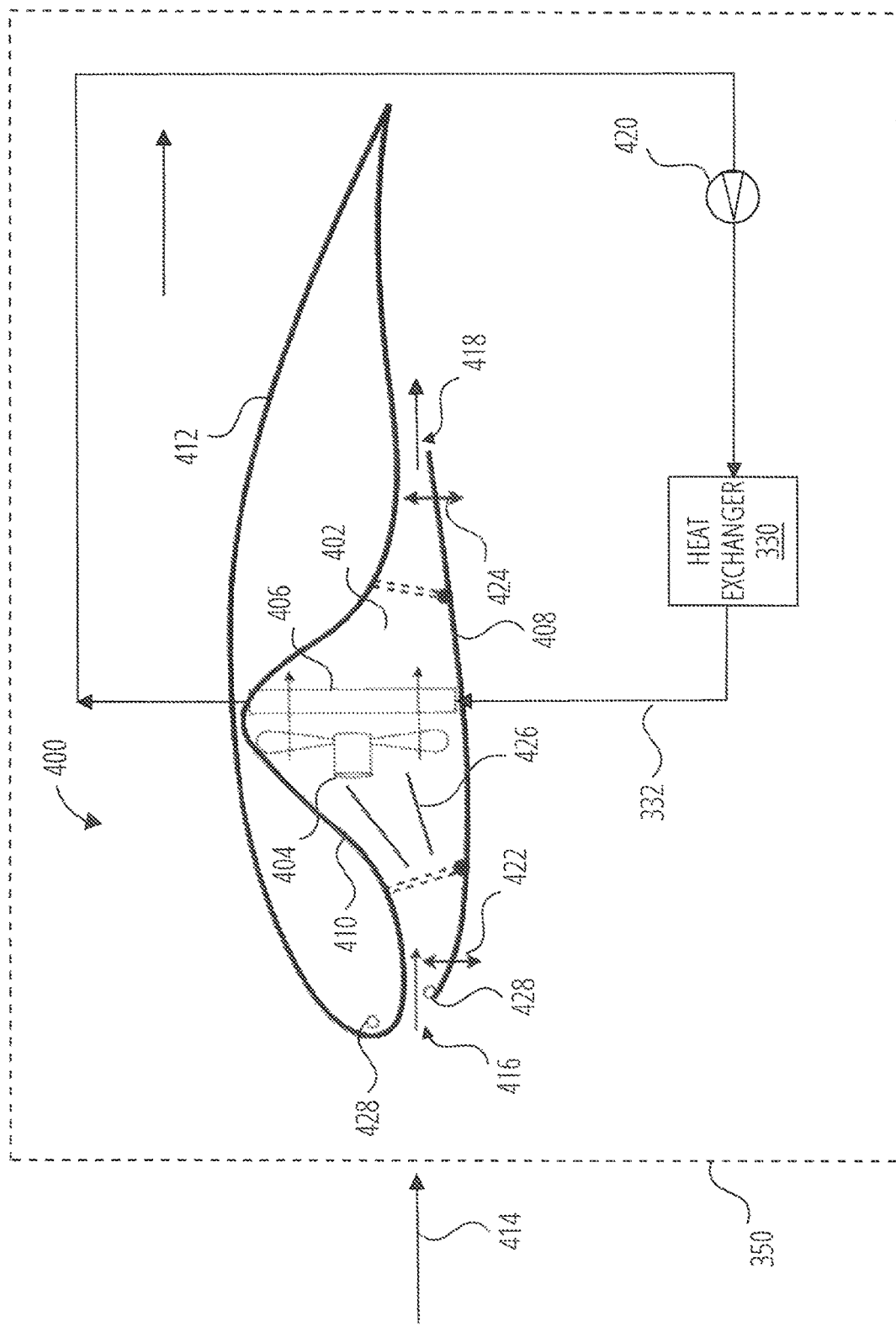
FIG. 4 is a schematic diagram illustrating the details of an integrated air-cooling system according to some examples and illustrated at a location under a wing or in a scoop attached under the wing.

FIG. 4 is a schematic diagram illustrating the details of an integrated air-cooling system 400 (shown by dashed line 350 in FIG. 3) according to some examples and illustrated at a location under a wing 412 or in a scoop attached under the wing 412. The integrated air-cooling system 400 comprises a radiator 406 and a fan 404 that are contained within a conduit 402 in the wing 412. The conduit 402 in FIG. 4 is defined by a lower surface 408 and an upper surface 410. At each end of the conduit are variable-geometry openings, shown in FIG. 4 as a variable-geometry inlet 416 and a variable-geometry outlet 418.

As shown in FIG. 4 in the dashed box 350, the coolant loop 332 passes coolant through the radiator 406 where the heat 318 that is generated by the operation of the fuel cell 310 is removed. The coolant loop 332 uses a pump 420 to circulate the coolant through the integrated air-cooling system 400 and the heat exchanger 330 where the coolant is cooled by cooling airflow 414. The heat exchanger 330 transfers heat generated by the fuel cell 310 to the coolant. The coolant is then transported to the integrated air-cooling system 400 to transfer heat from the coolant to the cooling airflow 414.

In some examples, the size of the variable-geometry inlet 416 is varied by means of an actuator 422 under control of the power electronics 206. Similarly, in some examples the size of the variable-geometry outlet 418 is varied by means of an actuator 424 that is also under control of the power electronics 206. In some examples, the sizes of the variable-geometry inlet 416 and the variable-geometry outlet 418 are varied by means of flaps that are movable to open or partially close the variable-geometry inlet 416 and the variable-geometry outlet 418 by the operation of their respectively actuators 422, 424. Alternatively, a surface (such as a lower surface 408) that is adjacent to the either the variable-geometry inlet 416, the variable-geometry outlet 418, or both, can be flexible to change the sizes of the openings.

In other examples, one or more of the actuators 422, 424 are optional. In these circumstances the sizes of the variable-geometry inlet 416, variable-geometry outlet 418, or both are manually adjusted (instead of using the actuators 422, 424). By way of example, the size of the variable-geometry inlet 416 or variable-geometry outlet 418 can be varied manually between flights by a ground crew. Because the aerodynamic performance of the wing 412 is more sensitive to the presence and size of the variable-geometry inlet 416, it is in some examples a narrow horizontal slot in the front of the wing 412.

The fan 404, which is also under control of the power electronics 206, draws the cooling airflow 414 into the conduit 402 via the variable-geometry inlet 416. The cooling airflow 414 enters the conduit 402 and is decelerated by a diffuser comprising an increase in cross section of the conduit 402 and vanes 426. The cooling airflow 414 then passes through the radiator 406 where it cools the coolant in the coolant loop 324. The flow of air in the conduit 402 then is reaccelerated by the profile of the conduit 402 before exiting via the variable-geometry outlet 418.

Depending on the mode of operation of the aircraft 100 and its operational parameters, including the functioning of the fuel cell 310 and other factors as will be described in more detail below, and under control of the power electronics 206, the speed of the fan 404, the size of the variable-geometry inlet 416 and the size of the variable-geometry outlet 418 are adjusted to provide a sufficient flow of air through the radiator 406 so as to provide sufficient or required cooling to the coolant in the coolant loop 332, and thus to the fuel cell 310.

The operation of the integrated air-cooling system 400 has relevance to VTOL aircraft, since when it is on the ground, taking off, landing or hovering, with the propulsion systems 108 in a vertical orientation, there is no or little rearward component to the cooling airflow 414. At the same time, the power drawn by the propulsion systems 108 is high since the wing 412 is not generating lift. In these modes of operation, the fan 404 is operating at relatively high speed and the variable-geometry inlet 416 and the variable-geometry outlet 418 are approximately fully open.

As the aircraft 100 transitions to forward flight, with the propulsion systems 108 transitioning into a horizontal orientation, air will start flowing naturally through the radiator 406 due to the ram air effect of the increasing horizontal component of the cooling airflow 414. Additionally, the wing 412 will begin generating lift, reducing the power drawn by the propulsion systems 108. The speed of the fan 404 can thus be reduced and it can potentially be brought to a halt as the aircraft 100 reaches cruising speed with the propulsion systems 108 in a horizontal orientation.

Additionally, the size of the variable-geometry inlet 416 and the variable-geometry outlet 418 is also reduced as the cooling airflow 414 transitions to forward flight. The variable-geometry outlet 418 typically is constricted so that the velocity of the cooling airflow 414 leaving the variable-geometry outlet 418 matches the speed of the external flow so as not to create drag as the airflow leaves the variable-geometry outlet 418. Similarly, the size of the variable-geometry inlet 416 is reduced to mitigate any adverse effects on the aerodynamic performance of the wing 412. The size of the variable-geometry outlet 418 is constricted so that it generates the correct amount of mass flow through the integrated air-cooling system 400 in order not to generate large internal flow losses.

As the aircraft 100 transitions from forward flight to hover or descend to land, the flow of air through the radiator 406 due to the ram air effect of the horizontal component of the cooling airflow 414 will decrease. In addition, the power drawn by the propulsion systems 108 will increase. The speed of the fan 404 is also increased to supplement or provide airflow in the conduit 402, and the size of the variable-geometry inlet 416 and the variable-geometry outlet 418 are also increased to facilitate an increase in the cooling airflow 414.

The fan 404, variable-geometry inlet 416, and the variable-geometry outlet 418 are controlled by the power electronics 206 or another control system in the aircraft 100 based on several factors. These factors include the output of one or more temperature, pressure or other sensors, the mode of flight of the aircraft, the orientation of the propulsion systems 108, the airspeed of the aircraft, and so forth. In some examples the speed of the fan is increased or decreased based on the temperature of the coolant leaving the radiator 406. In some examples, the size of the variable-geometry inlet 416 is based primarily on the mode of flight. Moreover, in some examples the size of the variable-geometry outlet 418 is based on a combination of the mode of flight and the airspeed of the aircraft 100. Additional sensors may also be provided. In some examples, a pitot tube is positioned in the variable-geometry outlet 418 to determine the velocity of the airflow leaving the variable-geometry outlet 418. This allows the size of the variable-geometry outlet 418 to be adjusted to match the velocity of the cooling airflow 414 leaving the variable-geometry outlet 418 to the speed of the cooling airflow 414.

In examples where the aerodynamic vehicle is an aircraft (such as the aircraft 100 shown in FIG. 1), the integrated air-cooling system 400 provides variable cooling of the fuel cell 310 during operation of the aircraft 100. An aircraft powered all or in part by a fuel cell typically has greater cooling requirements than an aircraft powered by a battery alone, although less than an internal combustion engine, the cooling of which is well known but that has different considerations and requirements.

Figure 5:
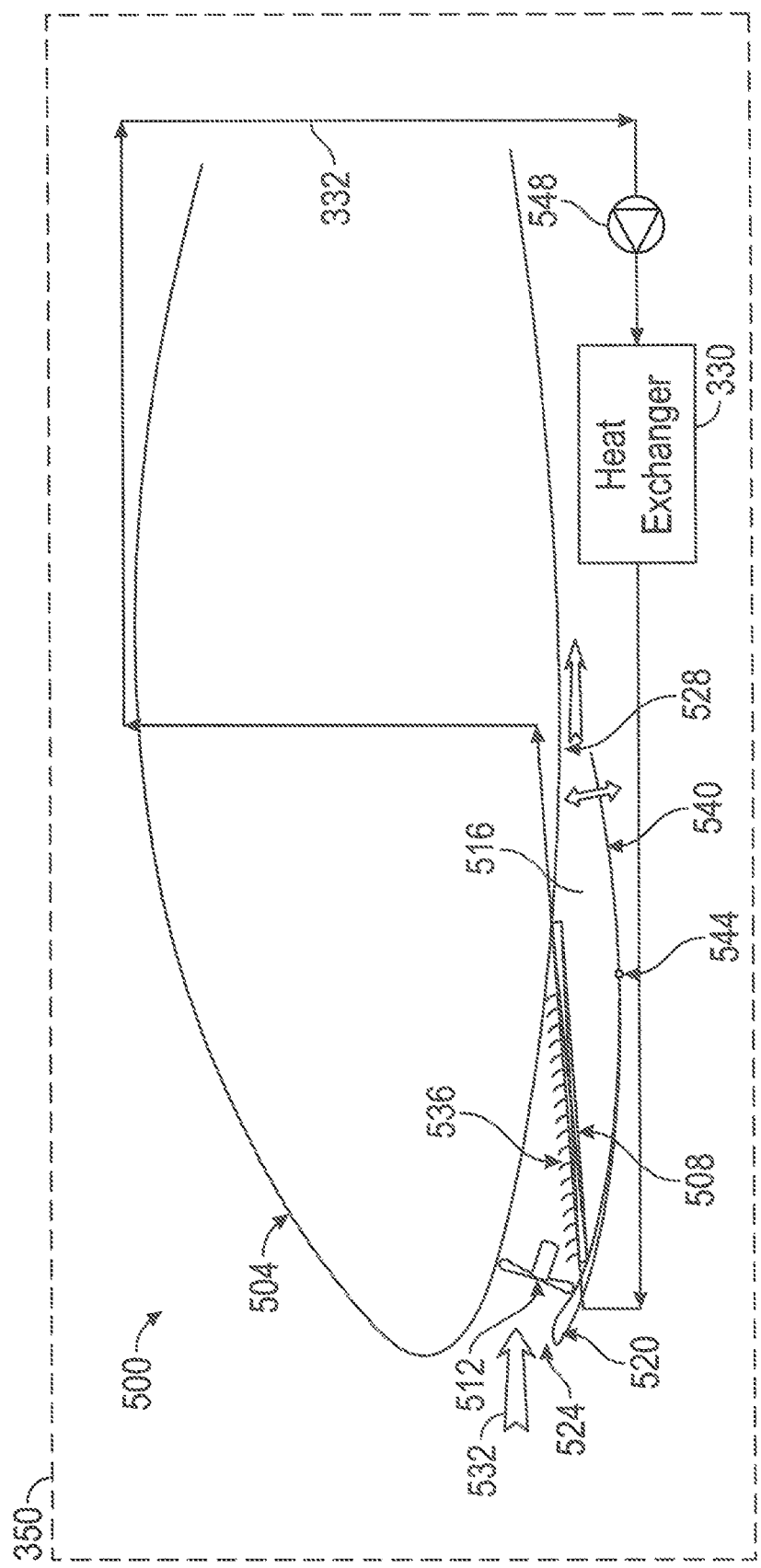
FIG. 5 is a schematic diagram illustrating a cross-section of an integrated air-cooling system according to some examples and illustrated at a location on any side of an aerodynamic structure (such as a fuselage or nacelle) or in a scoop attached to the aerodynamic structure.

FIG. 5 is a schematic diagram illustrating the cross-section of an integrated air-cooling system 500 (shown by dashed line 350 in FIG. 3) according to some examples and illustrated at a location on any side of an aerodynamic structure 504, such as the fuselage 114 or the nacelle 102 or in a scoop attached to the fuselage 114 or the nacelle 102. The integrated air-cooling system 500 includes a radiator 508 and a fan 512 that are contained within the aerodynamic structure 504. A conduit 516 is formed between a cowling 520 and the aerodynamic structure 504. At each end of the conduit 516 are variable-geometry openings, shown in FIG. 5 as a variable-geometry inlet 524 and a variable-geometry outlet 528.

The variable-geometry inlet 524 is located substantially to one side of the aerodynamic structure 504 (such as the fuselage 114 or the nacelle 102) to make efficient use of the externally slowed air at or near the stagnation point in that location. This enables high-efficiency pressure recovery and reduces pressure losses for the slowed air that enters the variable-geometry inlet 524, even when the freestream air is at relatively high speeds compared to the speed of the air at the variable-geometry inlet 524.

In some examples, the slowed air entering the variable-geometry inlet 524 passes through the fan 512. When the aerodynamic vehicle is an aircraft, the fan 512 increases cooling airflow 532 drawn through the variable-geometry inlet 524 when the forward velocity of the aircraft 100 is insufficient to provide the desired cooling air flow. This commonly occurs, for example, when on the ground, in high-ambient temperature environments, or during takeoff and landing.

In some examples, the integrated air-cooling system 500 includes turning vanes 536. The turning vanes 536 turn the cooling airflow 532 before flowing at relatively low speeds through the large face area of the radiator 508 that cools the coolant. The coolant is one or more of a variety of fluids or gases that can be used to cooling the fuel cells. The now warmed cooling airflow 532 then is accelerated to exit the aircraft at high speed through the variable-geometry outlet 528, which is a converging section of the conduit 516.

The geometry and size of the variable-geometry outlet 528 is varied in some examples by mechanical actuation of the rotation of a hinging flap 540 about a hinging axis 544 to maximize the exhaust velocity for a given cooling airflow 532 demand. This minimizes the net cooling airflow drag penalty and, some examples, maximizes the net cooling airflow 532 thrust at higher aircraft speeds. In other examples, the geometry of the variable-geometry inlet 524 and the variable-geometry outlet 528 are varied manually.

As shown in FIG. 5 in the dashed box 350, the coolant loop 332 passes coolant through the radiator 508 where the heat 318 that is generated by the operation of the fuel cell 310 is removed. The coolant loop 332 uses a pump 548 to circulate the coolant through the integrated air-cooling system 500 and the heat exchanger 330 where the coolant is cooled by the cooling airflow 532.

Figure 6:
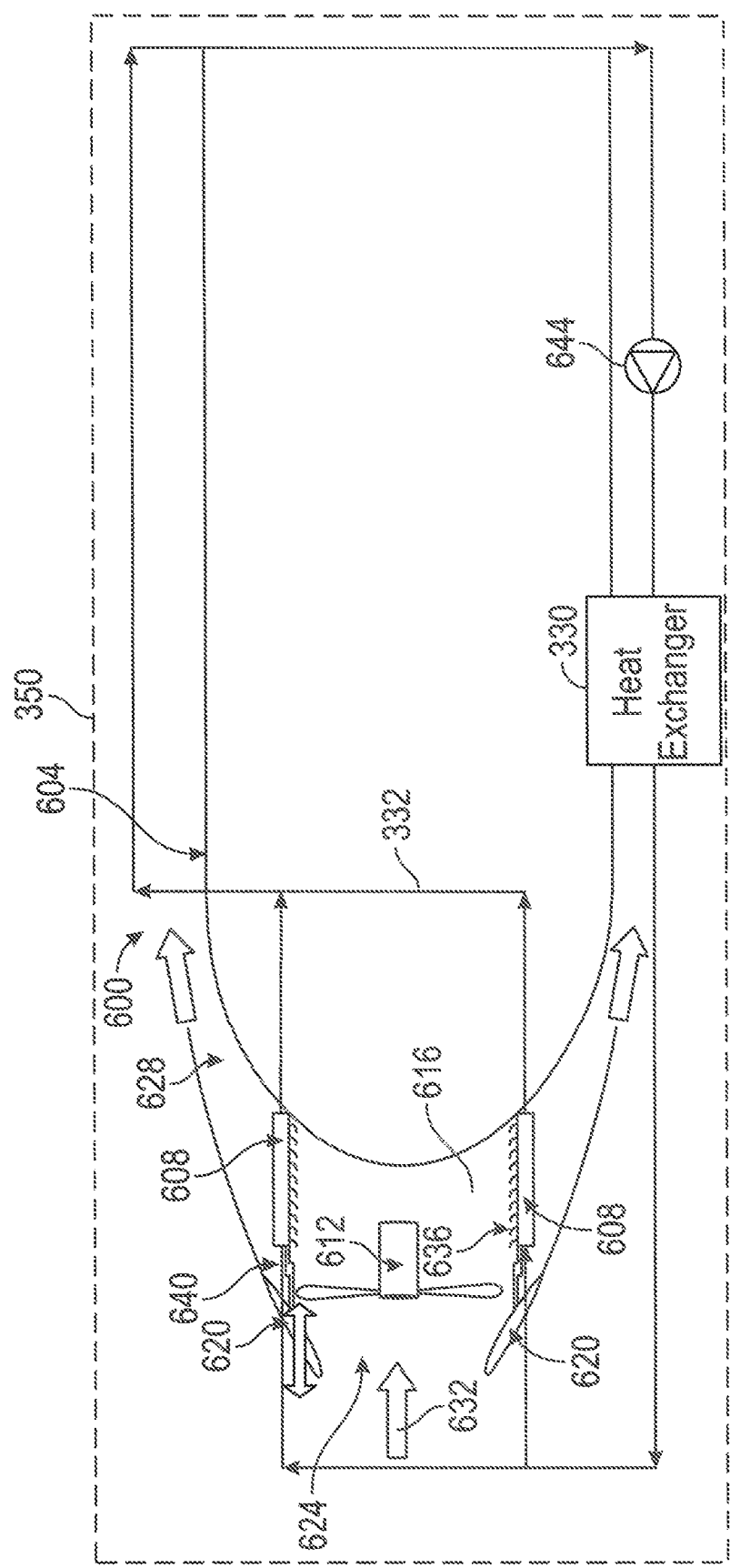
FIG. 6 is a schematic diagram illustrating a cross-section of an integrated air-cooling system according to some examples and illustrated at a location at the front of an aerodynamic structure (such as on the nose of a fuselage, the nose of a nacelle, or in a scoop at any of these locations.

FIG. 6 is a schematic diagram illustrating a cross-section of an integrated air-cooling system 600 (shown by dashed line 350 in FIG. 3) according to some examples and illustrated at a location at the front of an aerodynamic structure 604, such as on the nose of the fuselage 114, the nose of the nacelle 102, or in a scoop at any of these locations. The integrated air-cooling system 600 includes a radiator 608 and a fan 612 that are contained within the aerodynamic structure 604. A conduit 616 is formed between an axially-moving cowling 620 and the aerodynamic structure 604. At each end of the conduit 616 are variable-geometry openings, shown in FIG. 6 as a variable-geometry inlet 624 and a variable-geometry outlet 628.

In the examples of FIG. 6, the variable-geometry inlet 624 is located substantially in front of the fuselage or nacelle nose to make efficient use of the externally slowed air at or near the stagnation point in that location to enable high-efficiency pressure recovery and reduce pressure losses for cooling airflow 632 that enters the variable-geometry inlet 624 even when the aircraft is flying at relatively high speeds compared to the velocity of the incoming cooling airflow 632.

In some examples, the cooling airflow 632 passes through the fan 612. The fan 612 is used to increase the cooling airflow through the variable-geometry inlet 624 when the forward velocity of the aircraft is insufficient to provide the desired cooling air flow, as noted above.

In some examples, the cooling airflow 632 is turned by turning vanes 636 before flowing at relatively low speeds through the large face area of the radiator 608 that is arranged in a generally cylindrical form to cool the coolant fluid or fluids. The warmed cooling airflow 632 then accelerates to exit the aircraft at high speed through the variable-geometry outlet 628 formed between the axially-moving cowling 620 and the aerodynamic structure 604 (such as the fuselage 114 or nacelle 102).

In some examples, the output area of the variable-geometry outlet 628 is varied by mechanical actuation of axial movement of the axially-moving cowling 620 relative to the aerodynamic structure 604 by means of a linear actuator and air sealing assembly 640. This serves to maximize the cooling airflow 632 that is exiting the variable-geometry outlet 628 for a given cooling airflow 632 demand and thereby minimizes the net cooling airflow 632 drag penalty. In addition, for some examples, this serves to maximize the net cooling airflow 632 thrust exiting the variable-geometry outlet 628 at higher aircraft speeds. In other examples, the geometry of the variable-geometry inlet 624 and the variable-geometry outlet 628 are varied manually.

As shown in FIG. 6 in the dashed box 350, the coolant loop 332 passes coolant through the radiator 608 where the heat 318 that is generated by the operation of the fuel cell 310 is removed. The coolant loop 332 uses a pump 644 to circulate the coolant through the integrated air-cooling system 600 and the heat exchanger 330 where the coolant is warmed by operation of the fuel cell.

Figure 7:
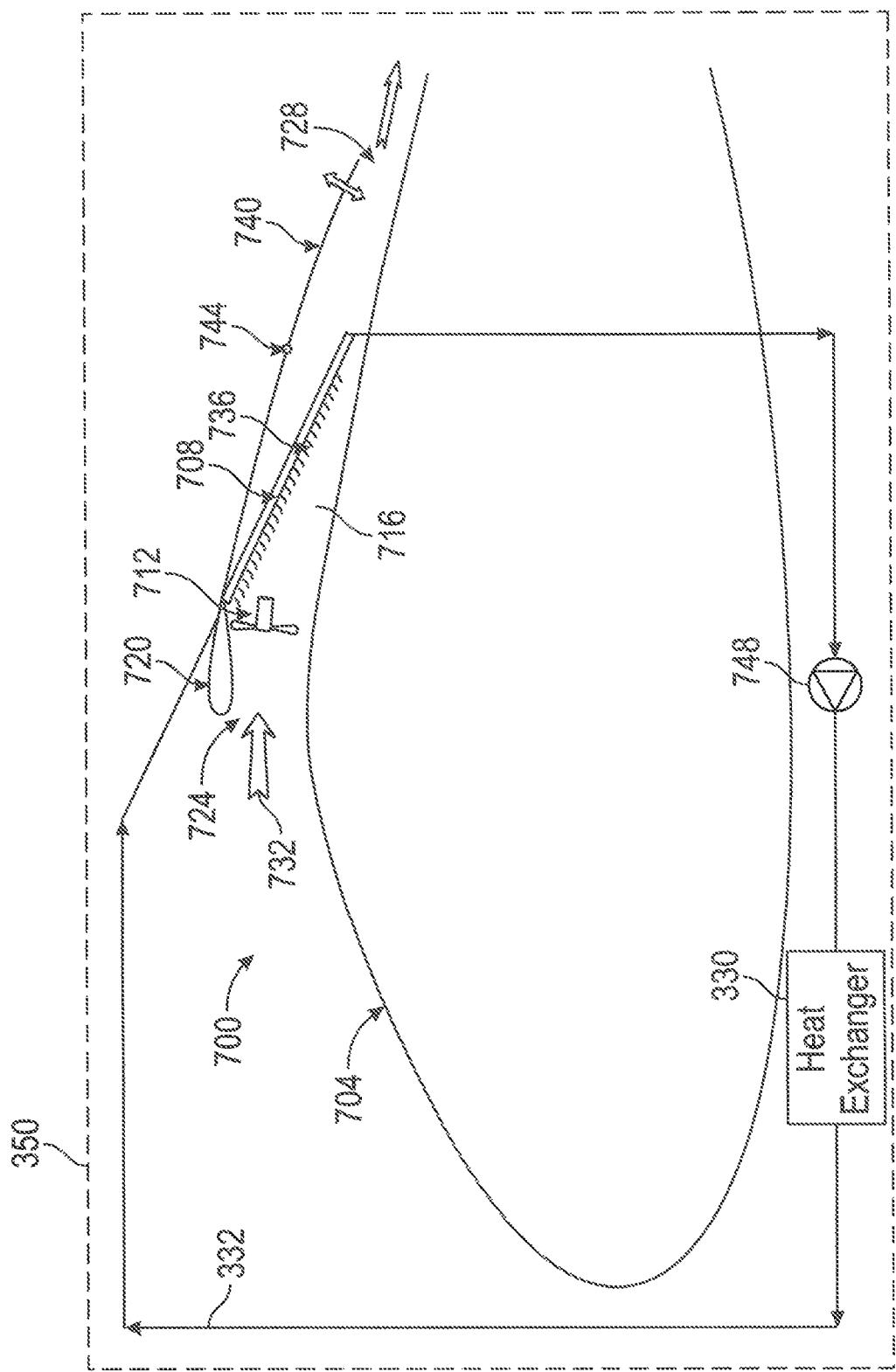
FIG. 7 is a schematic diagram illustrating a cross-section of an integrated air-cooling system according to some examples and illustrated at a location at any side, top, or bottom of an aerodynamic structure (such as a fuselage, a nacelle, or in a scoop attached to the fuselage or the nacelle.

FIG. 7 is a schematic diagram illustrating a cross-section of an integrated air-cooling system 700 (shown by dashed line 350 in FIG. 3) according to some examples and illustrated at a location at any side, top, or bottom of an aerodynamic structure 704, such as the fuselage 114 or the nacelle 102 or in a scoop attached to the fuselage 114 or the nacelle 102. The integrated air-cooling system 700 includes a radiator 708 and a fan 712 that are contained within the aerodynamic structure 704. A conduit 716 is formed between a cowling 720 and the aerodynamic structure 704. At each end of the conduit 716 are variable-geometry openings, shown in FIG. 7 as a variable-geometry inlet 724 and a variable-geometry outlet 728.

In the examples of FIG. 7, the variable-geometry inlet 724 is located at any side, top, or bottom of the aerodynamic structure 704 to create a stagnation point in front of the cowling 720 to efficiently slow the freestream air in that location. This allows a high-efficiency pressure recovery and reduces pressure losses for cooling airflow 732 entering the variable-geometry inlet 724. In examples where the aerodynamic vehicle is an aircraft, this is true even when the aircraft 100 is flying at relatively high speeds compared to the velocity of the cooling airflow 732 at the variable-geometry inlet 724.

In some examples, the cooling airflow 732 passes through the fan 712. The fan 712 is used to increase the cooling airflow through the variable-geometry inlet 724 when the forward velocity of the aircraft is insufficient to provide the desired cooling air flow, as noted above.

In some examples, the cooling airflow 732 is turned by turning vanes 736 before flowing at relatively low speeds through the large face area of the radiator 708 to cool the coolant fluid or fluids. The warmed cooling airflow 732 then accelerates to exit the aircraft at high speed through the variable-geometry outlet 728. In some examples, the output area of the variable-geometry outlet 728 is varied by mechanical actuation of rotation of a hinging flap 740 about a hinging axis 744. This actuation, in some examples, is performed by an actuator. In other examples, the geometry of the variable-geometry outlet 728 is varied manually. This serves to maximize the cooling airflow 732 that is exiting the variable-geometry outlet 728 for a given cooling airflow 732 demand and thereby minimizes the net cooling airflow 732 drag penalty. In addition, for some examples, this serves to maximize the net cooling airflow 732 thrust exiting the variable-geometry outlet 728 at higher aircraft speeds.

As shown in FIG. 7 in the dashed box 350, the coolant loop 332 passes coolant through the radiator 708 where the heat 318 that is generated by the operation of the fuel cell 310 is removed. The coolant loop 332 uses a pump 748 to circulate the coolant through the integrated air-cooling system 700 and the heat exchanger 330 where the coolant is warmed operation of the fuel cell.

Figure 8:
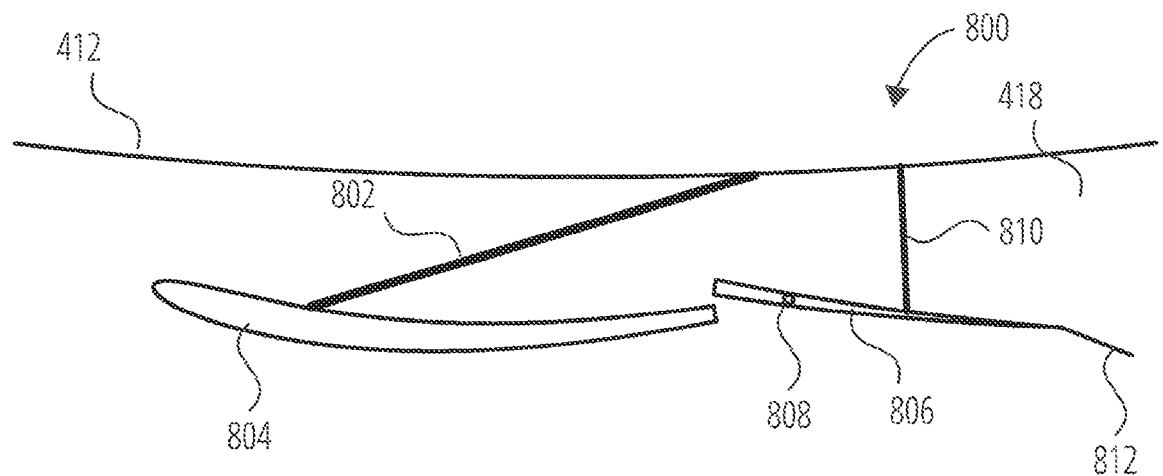
FIG. 8 is a schematic diagram illustrating an example of an automatic control mechanism for varying the size of any of the variable-geometry openings, such as the variable-geometry inlets and the variable-geometry outlet shown in FIGS. 4 to 7.

FIG. 8 is a schematic diagram illustrating an example of an automatic control mechanism 800 for varying the size of any of the variable-geometry openings, such as the variable-geometry inlets and the variable-geometry outlet shown in FIGS. 4 to 7. In this example, the aerodynamic vehicle is the aircraft 100 and the variable-geometry opening is the variable-geometry outlet 418.

As shown in FIG. 8, the wing 412 includes an aerodynamic surface 804 and a radiator 802. The automatic control mechanism 800 includes a flap 806 mounted for rotation about a pivot point 808, and a compression spring 810, or other spring mechanism, which biases the flap 806 to an open position shown in FIG. 8. This will typically occur, for example, when the aircraft 100 is stationary (hovering or on the ground) or moving vertically. The location of the pivot point 808 is chosen such that the aerodynamic loads are correctly balanced. At the trailing edge of the flap 806, there is an aerodynamic surface, which in FIG. 8 is illustrated as a Gurney flap 812. In other examples, the aerodynamic surface is a separate airfoil. The Gurney flap 812 used in these examples generates a consistent aerodynamic moment for closing the flap 806 appropriately. Instead of the Gurney flap 812 (or other special trailing edge aerodynamic surface), it is possible to configure the system to function just by duct shaping and pivot point location choice.

Figure 9:
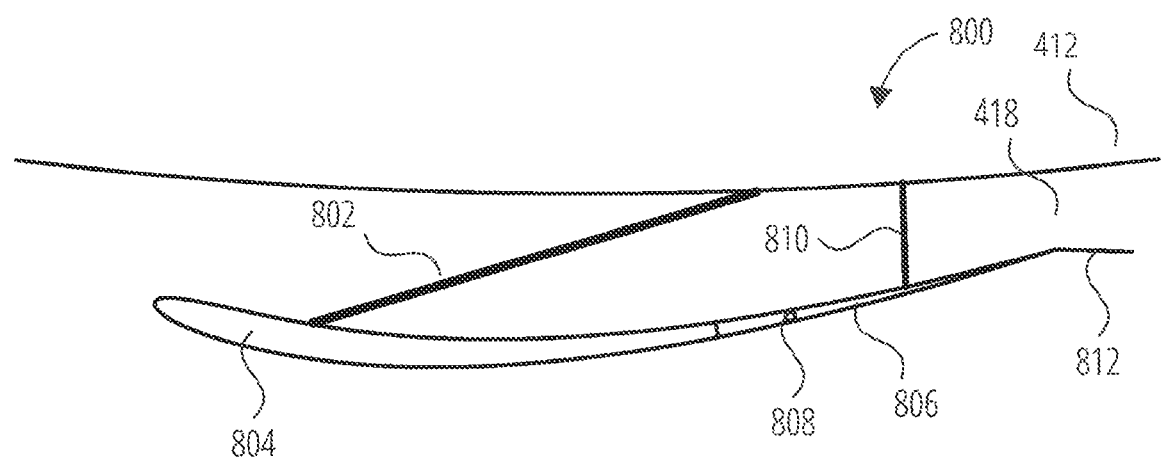
FIG. 9 is a schematic diagram illustrating the example shown in FIG. 8 but when the variable-geometry outlet is in a partially-closed configuration.

FIG. 9 is a schematic diagram illustrating the example shown in FIG. 8 but when the variable-geometry outlet 418 is in a partially-closed configuration. In this example, as the airspeed builds, aerodynamic forces and moments on the flap 806 increase with speed and therefore overpower the spring 810 to partially close the variable-geometry outlet 418, as shown in FIG. 9. This provides an airspeed sensitive mechanism that varies the cooling airflow 414 through the radiator 802 with the airspeed of the aircraft 100. While the control mechanism 800 is described as located the wing 412, it should be noted, as described above, that it could located in the fuselage 114, the nacelle 102, or any other part of the structure of the aircraft 100 or aerodynamic vehicle.

Figure 10:
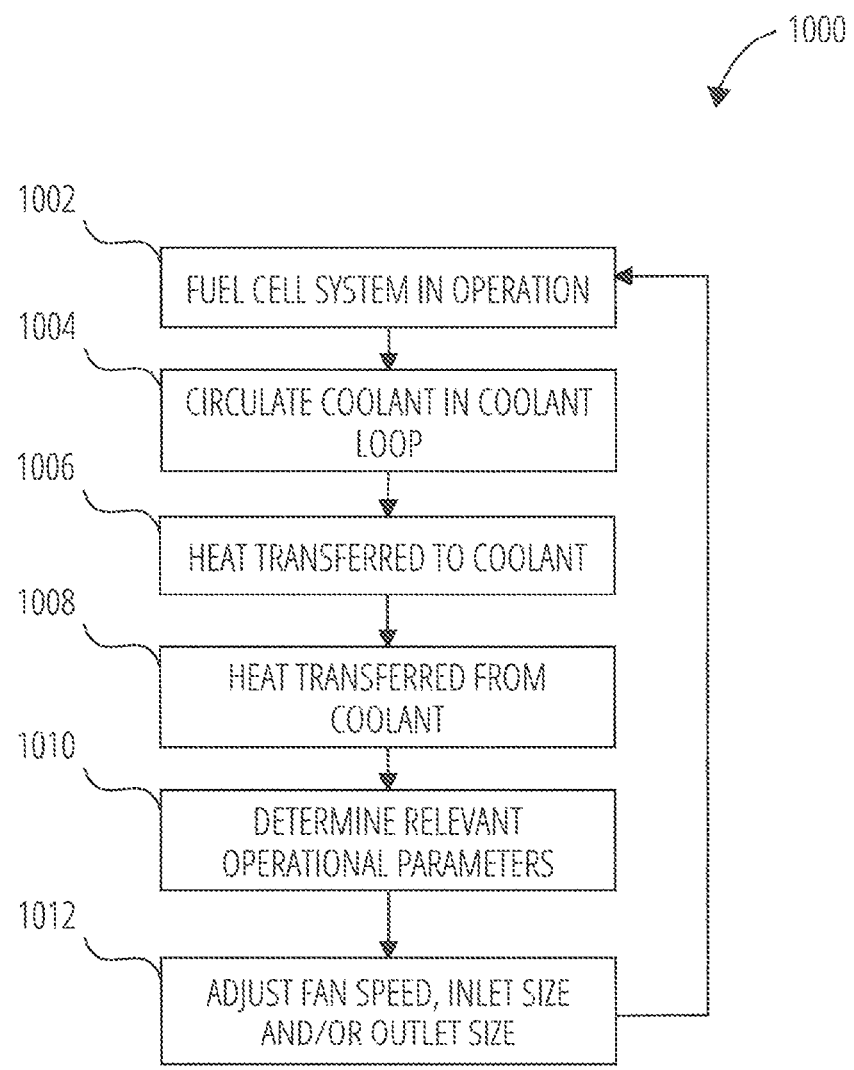
FIG. 10 is a flowchart illustrating operation of the fuel cell system including the integrated air-cooling systems, according to some examples.

FIG. 10 is a flowchart 1000 illustrating operation of the fuel cell system 300 including the integrated air-cooling system 400, 500, 600, 700, according to some examples. The flowchart is performed by the fuel cell system 300 and the integrated air-cooling system 400, 500, 600, 700 under computer control of the power electronics 206 or other aircraft system processors. The method steps are accomplished by the power electronics 206 providing control signals to corresponding components in the system. The method steps are initiated by the power electronics 206 based at least in part on signals received from sensors located in the systems 300, 400, 500, 600, 700, and on flight status information from the aircraft's control system.

The flowchart 1000 commences at operation 1002 in FIG. 10, in which the fuel cell system 300 is operating. Coolant is circulated in the coolant loop 332 in operation 1004 by operation of the pump 420, 548, 644, 748. Heat 318 generated by the fuel cell 310 is passed to the coolant in coolant loop 332 in heat exchanger 330, in operation 1006. Heat is passed from the coolant in coolant loop 332 to the cooling airflow 414, 532, 632, 732 in the conduit 402, 516, 616, 716, via the radiator 406, 508, 608, 708, in operation 1008.

Relevant operational parameters of the integrated air-cooling system 400, 500, 600, 700, and the aircraft 100 are determined in operation 1010. The parameters can include the temperature of the fuel cell, the temperature of the coolant at various points in the coolant loop 332, such as leaving (downstream from) the heat exchanger 330 or leaving (downstream from) the radiator 406, 508, 608, 708 the airspeed of the aircraft, the speed of the airflow leaving the variable-geometry outlet 418, 528, 628, 728 the orientation of the propulsion systems 108 (vertical or horizontal), the state of transition of the orientation of the propulsion systems 108 between vertical and horizontal, and so forth.

In operation 1012, based on the operational parameters determined in operation 1010, various parameters are adjusted to manage the cooling airflow 414, 532, 632, 732. These parameters include any of the following parameters alone or in any combination including the speed of the fan 404, 512, 612, 712, the size of the variable-geometry inlet 416, 524, 624, 724, and the size of the variable-geometry outlet 418, 528, 628, 728. The method then returns to operation 1002, with the fuel cell in operation, and proceeds from there while the fuel cell 310 and the ducted fan are operating.

Figure 11:
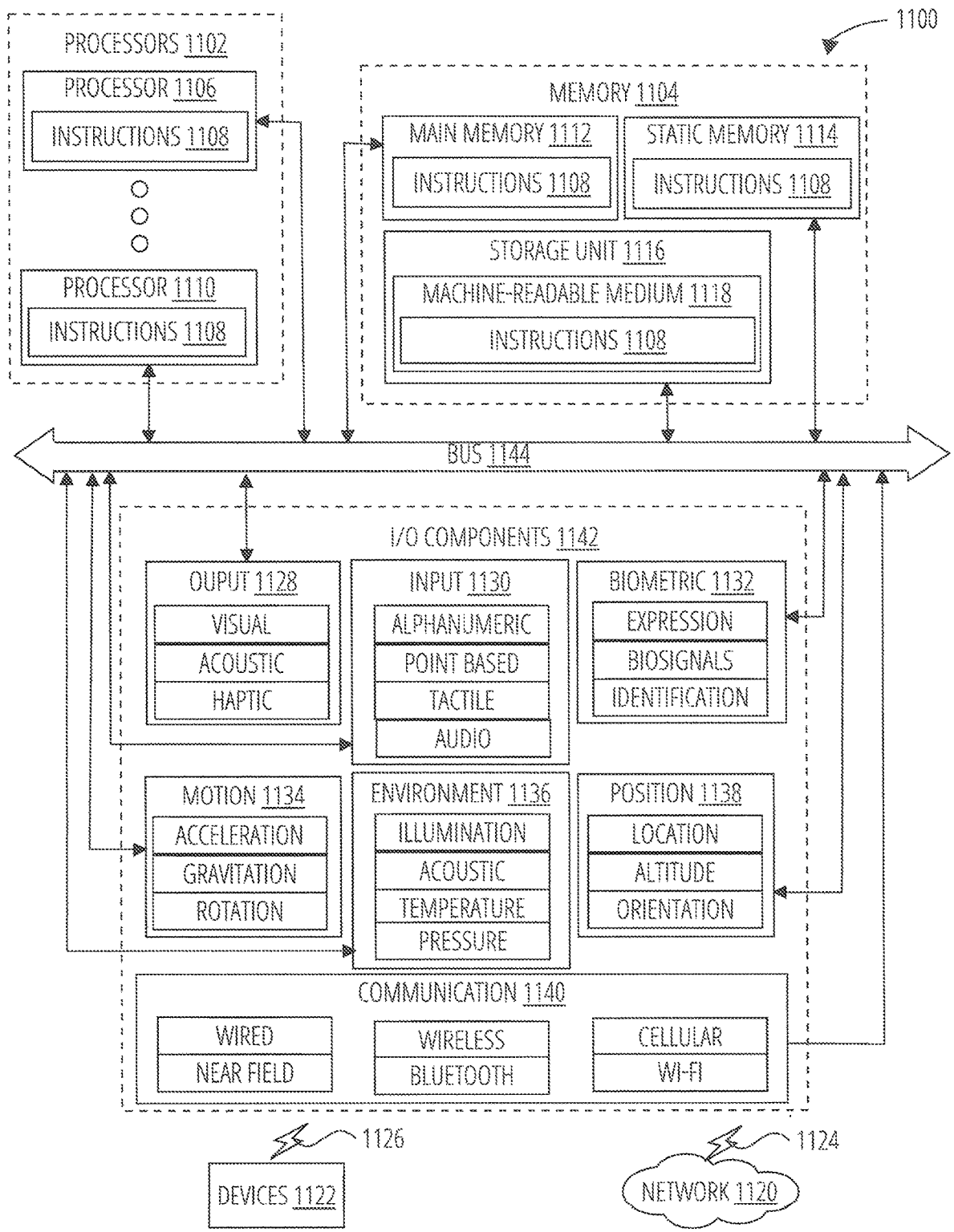
FIG. 11 illustrates a diagrammatic representation of a machine in the form of a computer system within which a set of instructions may be executed for causing the machine to perform any one or more of the methodologies discussed herein, according to some examples.

FIG. 11 illustrates a diagrammatic representation of a machine 1100 in the form of a computer system within which a set of instructions may be executed for causing the machine to perform any one or more of the methodologies discussed herein, according to an example. For example, power electronics 206 may be embodied as machine 1100.

Specifically, FIG. 11 shows a diagrammatic representation of the machine 1100 in the example form of a computer system, within which instructions 1108 (e.g., software, a program, an application, an applet, an app, or other executable code) for causing the machine 1100 to perform any one or more of the methodologies discussed herein may be executed. The instructions 1108 transform the general, non-programmed machine 1100 into a particular machine 1100 programmed to carry out the described and illustrated functions in the manner described. In alternative examples, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines 1100 that individually or jointly execute the instructions 1108 to perform any one or more of the methodologies discussed herein.

The machine 1100 may include processors 1102, memory 1104, and I/O components 1142, which may be configured to communicate with each other such as via a bus 1144. In an example, the processors 1102 (e.g., a Central Processing Unit (CPU), a Reduced Instruction Set Computing (RISC)

processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1106 and a processor 1110 that may execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single core, a single processor with multiple cores (e.g., a multi-core processor), multiple processors with a single core, multiple processors with multiples cores, or any combination thereof.

The memory 1104 may include a main memory 1112, a static memory 1114, and a storage unit 1116, both accessible to the processors 1102 such as via the bus 1144. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1142 may include a wide variety of components to receive input, provide output, produce output, transmit information, exchange information, capture measurements, and so on. The specific I/O components 1142 that are included in a particular machine will depend on the type of machine. For example, portable machines such as mobile phones will likely include a touch input device or other such input mechanisms, while a headless server machine will likely not include such a touch input device. It will be appreciated that the I/O components 1142 may include many other components that are not shown in FIG. 11. The I/O components 1142 are grouped according to functionality merely for simplifying the following discussion and the grouping is in no way limiting. In various examples, the I/O components 1142 may include output components 1128 and input components 1130. The output components 1128 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1130 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1142 may include biometric components 1132, motion components 1134, environmental components 1136, or position components 1138, among a wide array of other components. For example, the biometric components 1132 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environmental components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1142 may include communication components 1140 operable to couple the machine 1100 to a network 1120 or devices 1122 via a coupling 1124 and a coupling 1126, respectively. For example, the communication components 1140 may include a network interface component or another suitable device to interface with the network 1120. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geolocation, location via Wi-Fi® signal triangulation, location via detecting an NFC beacon signal that may indicate a particular location, and so forth.

Executable Instructions and Machine Storage

The various memories (i.e., memory 1104, main memory 1112, static memory 1114, and/or memory of the processors 1102) and/or storage unit 1116 may store one or more sets of instructions and data structures (e.g., software) embodying or utilized by any one or more of the methodologies or functions described herein. These instructions (e.g., the instructions 1108), when executed by processors 1102, cause various operations to implement the disclosed examples.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data in a non-transitory manner and that can be read by one or more processors. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various examples, one or more portions of the network 1120 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1120 or a portion of the network 1120 may include a wireless or cellular network, and the coupling 1124 may be a Code Division Multiple Access (CDMA) connection, a Global System for Mobile communications (GSM) connection, or another type of cellular or wireless coupling. In this example, the coupling 1124 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1108 may be transmitted or received over the network 1120 using a transmission medium via a network interface device (e.g., a network interface component included in the communication components 1140) and utilizing any one of a number of well-known transfer protocols (e.g., hypertext transfer protocol (HTTP)). Similarly, the instructions 1108 may be transmitted or received using a transmission medium via the coupling 1126 (e.g., a peer-to-peer coupling) to the devices 1122. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1108 for execution by the machine 1100, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Additional Notes

The following, non-limited examples, detail certain aspects of the present subject matter to solve the challenges and provide the benefits discussed herein, among others.

Example 1 is a method of managing cooling of a fuel cell on an aerodynamic vehicle, the method comprising: transferring heat generated by operation of the fuel cell to a coolant; circulating the coolant to a radiator located in a conduit; cooling the fuel cell by transferring heat from the coolant to a cooling airflow passing through the conduit and over the radiator; and adjusting the cooling of the fuel cell by varying a geometry of at least one opening to the conduit to adjust an amount of cooling airflow over the radiator.

In Example 2, the subject matter of Example 1 includes, wherein the aerodynamic vehicle is an aircraft, and wherein adjusting the cooling of the fuel cell further comprises: determining operational parameters of the aircraft; and varying the geometry of the at least one opening to the conduit based on the operational parameters of the aircraft.

In Example 3, the subject matter of Example 2 includes, wherein the at least one opening comprises a variable-geometry outlet, and further comprising varying a size of the variable-geometry outlet based on an airspeed of the aircraft.

In Example 4, the subject matter of Examples 2-3 includes, wherein the at least one opening comprises a variable-geometry inlet, and further comprising varying a size of the variable-geometry inlet based on an airspeed of the aircraft.

In Example 5, the subject matter of Examples 2-4 includes, wherein the at least one opening comprises a variable-geometry inlet and a variable-geometry outlet, the method further comprising: varying a size of the variable-geometry inlet based on the operational parameters; varying a size of the variable-geometry outlet based on the operational parameters; and adjusting a speed of a fan located in the conduit based on the operational parameters.

In Example 6, the subject matter of Examples 1-5 includes, wherein operational parameters comprise a temperature of the coolant downstream from the fuel cell.

In Example 7, the subject matter of Examples 1-6 includes, wherein the aerodynamic vehicle is an aircraft that further comprises a propulsion system that is rotatable between a vertical flight orientation and a horizontal flight orientation, wherein the at least one opening comprises at least one of: (a) a variable-geometry inlet; and (b) a variable-geometry outlet, and further comprising varying a size of at least one of: (c) the variable-geometry inlet; and, (d) the variable-geometry outlet, based on an orientation of the propulsion system.

Example 8 is an aircraft, comprising: a propulsion system; a fuel cell system including a fuel cell powered by hydrogen received from a supply of hydrogen; a first heat exchanger for transferring heat from the fuel cell to a coolant fluid located in a coolant loop; a second heat exchanger located in a conduit in the aircraft for transferring heat to a cooling airflow passing through the conduit; and at least one variable-geometry opening to allow the cooling airflow to pass into or out of the conduit.

In Example 9, the subject matter of Example 8 includes, a control system for varying a size of the at least one variable-geometry opening based on operational parameters of the aircraft.

In Example 10, the subject matter of Example 9 includes, a fan located in the conduit, wherein the control system varies a speed of the fan based on the operational parameters of the aircraft.

In Example 11, the subject matter of Examples 9-10 includes, wherein the at least one variable-geometry opening comprises a variable-geometry outlet and the size of the variable-geometry outlet is varied by the control system based on an airspeed of the aircraft.

In Example 12, the subject matter of Examples 9-11 includes, wherein the propulsion system is rotatable between a vertical flight orientation and a horizontal flight orientation, wherein the at least one variable-geometry opening comprises at least one of: (a) a variable-geometry inlet; and (b) a variable-geometry outlet, and the size of at least one of: (c) the variable-geometry inlet; and, (d) the variable-geometry outlet, is varied based on an orientation of the propulsion system.

In Example 13, the subject matter of Examples 8-12 includes, a control system for varying a size of the at least one variable-geometry opening based on operational parameters of the aircraft; and a fan located in the conduit, wherein the at least one variable-geometry opening comprises a variable-geometry inlet and a variable-geometry outlet, and wherein the control system controls the size of the variable-geometry inlet, the size of the variable-geometry outlet, and a speed of the fan based on the operational parameters.

Example 14 is a non-transitory computer-readable storage medium including instructions that when executed by a computer, cause the computer to perform operations for managing a cooling airflow to cool a fuel cell on an aircraft, the operations comprising: circulating a coolant fluid from the fuel cell to a radiator located in a conduit; cooling the fuel cell by transferring heat from the coolant fluid to the cooling airflow flowing through the conduit and over the radiator; and determining operational parameters of the aircraft; and managing an amount of cooling airflow passing over the radiator by adjusting a size of at least one variable-geometry opening to the conduit, wherein the size of the at least one variable-geometry opening to the conduit is adjusted based on the operational parameters.

In Example 15, the subject matter of Example 14 includes, wherein the at least one variable-geometry opening comprises a variable-geometry outlet, and the size of the variable-geometry outlet is varied based on an airspeed of the aircraft.

In Example 16, the subject matter of Example 15 includes, the operations further comprising: adjusting a speed of a fan located in the conduit based on the operational parameters.

In Example 17, the subject matter of Examples 14-16 includes, wherein the at least one variable-geometry opening comprises a variable-geometry inlet and a size of the variable-geometry inlet is varied based on an airspeed of the aircraft.

In Example 18, the subject matter of Examples 14-17 includes, wherein the aircraft includes a propulsion system that is rotatable between a vertical flight orientation and a horizontal flight orientation, wherein the at least one variable-geometry opening comprises a variable-geometry inlet, and the size of the variable-geometry inlet is varied based on an orientation of the propulsion system.

In Example 19, the subject matter of Examples 14-18 includes, wherein the operational parameters comprise a temperature of the coolant fluid downstream from the fuel cell.

In Example 20, the subject matter of Examples 14-19 includes, wherein the at least one variable-geometry opening comprises a variable-geometry inlet and a variable-geometry outlet, the operations further comprising: adjusting a size of the variable-geometry inlet based on the operational parameters; adjusting a size of the variable-geometry outlet based on the operational parameters; and adjusting a speed of a fan located in the conduit based on the operational parameters.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Examples of the system and method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the examples of the invention disclosed herein without departing from the scope of this invention defined in the following claims.

The above-detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of managing cooling of a fuel cell on an aerodynamic vehicle, the method comprising:
   transferring heat generated by operation of the fuel cell to a coolant;
   circulating the coolant to a radiator located in a conduit;
   cooling the fuel cell by transferring heat from the coolant to a cooling airflow passing through the conduit and over the radiator; and
   adjusting the cooling of the fuel cell by varying a geometry of at least one opening to the conduit to adjust an amount of cooling airflow over the radiator,
   wherein the aerodynamic vehicle is an aircraft that comprises a propulsion system that is rotatable between a vertical flight orientation and a horizontal flight orientation, wherein the at least one opening comprises at least one of: (a) a variable-geometry inlet; and (b) a variable-geometry outlet, and further comprising varying a size of at least one of: (c) the variable-geometry inlet; and, (d) the variable-geometry outlet, based on an orientation of the propulsion system.

2. The method of claim 1, wherein adjusting the cooling of the fuel cell further comprises:
   determining operational parameters of the aircraft; and
   varying the geometry of the at least one opening to the conduit based on the operational parameters of the aircraft.

3. The method of claim 2, wherein the at least one opening comprises a variable-geometry outlet, and further comprising varying a size of the variable-geometry outlet based on an airspeed of the aircraft.

4. The method of claim 2, wherein the at least one opening comprises a variable-geometry inlet, and further comprising varying a size of the variable-geometry inlet based on an airspeed of the aircraft.

5. The method of claim 2, wherein the at least one opening comprises a variable-geometry inlet and a variable-geometry outlet, the method further comprising:
   varying a size of the variable-geometry inlet based on the operational parameters;
   varying a size of the variable-geometry outlet based on the operational parameters; and
   adjusting a speed of a fan located in the conduit based on the operational parameters.

6. The method of claim 2, wherein operational parameters comprise a temperature of the coolant downstream from the fuel cell.

7. An aircraft, comprising:
   a propulsion system;
   a fuel cell system including a fuel cell powered by hydrogen received from a supply of hydrogen;
   a first heat exchanger for transferring heat from the fuel cell to a coolant fluid located in a coolant loop;
   a second heat exchanger located in a conduit in the aircraft for transferring heat to a cooling airflow passing through the conduit;
   at least one variable-geometry opening to allow the cooling airflow to pass into or out of the conduit; and
   a control system for varying a size of the at least one variable-geometry opening based on operational parameters of the aircraft;
   wherein the propulsion system is rotatable between a vertical flight orientation and a horizontal flight orientation;
   wherein the at least one variable-geometry opening comprises at least one of: (a) a variable-geometry inlet; and (b) a variable-geometry outlet;
   wherein the control system is configured to vary the size of at least one of: (c) the variable-geometry inlet; and, (d) the variable-geometry outlet, based on an orientation of the propulsion system.

8. The aircraft of claim 7, further comprising:
   a fan located in the conduit, wherein the control system is also configured to vary a speed of the fan based on the operational parameters of the aircraft.

9. The aircraft of claim 7, wherein the at least one variable-geometry opening comprises a variable-geometry outlet and wherein the control system is also configured to vary the size of the variable-geometry outlet based on an airspeed of the aircraft.

10. The aircraft of claim 7, further comprising:
    a control system configured to vary a size of the at least one variable-geometry opening based on operational parameters of the aircraft; and
    a fan located in the conduit,
    wherein the at least one variable-geometry opening comprises a variable-geometry inlet and a variable-geometry outlet, and wherein the control system controls the size of the variable-geometry inlet, the size of the variable-geometry outlet, and a speed of the fan based on the operational parameters.

11. A non-transitory computer-readable storage medium including instructions that when executed by a computer, cause the computer to perform operations for managing a cooling airflow to cool a fuel cell on an aircraft, the operations comprising:
    circulating a coolant fluid from the fuel cell to a radiator located in a conduit;
    cooling the fuel cell by transferring heat from the coolant fluid to the cooling airflow flowing through the conduit and over the radiator;
    determining operational parameters of the aircraft; and
    managing an amount of cooling airflow passing over the radiator by adjusting a size of at least one variable-geometry opening to the conduit, wherein the size of the at least one variable-geometry opening to the conduit is adjusted based on the operational parameters;

wherein the instructions, when executed by the computer, cause the computer to perform the operations for managing the cooling airflow to cool the fuel cell on the aircraft having a propulsion system that is rotatable between a vertical flight orientation and a horizontal flight orientation;

wherein the at least one variable-geometry opening comprises a variable-geometry inlet, and the operations further comprise varying a size of the variable-geometry inlet based on an orientation of the propulsion system.

12. The computer-readable storage medium of claim 11, wherein the at least one variable-geometry opening comprises a variable-geometry outlet, and the size of the variable-geometry outlet is varied based on an airspeed of the aircraft.

13. The computer-readable storage medium of claim 12, the operations further comprising:

adjusting a speed of a fan located in the conduit based on the operational parameters.

14. The computer-readable storage medium of claim 11, wherein the at least one variable-geometry opening comprises a variable-geometry inlet and a size of the variable-geometry inlet is varied based on an airspeed of the aircraft.

15. The computer-readable storage medium of claim 11, wherein the operational parameters comprise a temperature of the coolant fluid downstream from the fuel cell.

16. The computer-readable storage medium of claim 11, wherein the at least one variable-geometry opening comprises a variable-geometry inlet and a variable-geometry outlet, the operations further comprising:

adjusting a size of the variable-geometry inlet based on the operational parameters;

adjusting a size of the variable-geometry outlet based on the operational parameters; and adjusting a speed of a fan located in the conduit based on the operational parameters.

\* \* \* \* \*